(12) United States Patent
Jocham

(10) Patent No.: US 6,935,706 B2
(45) Date of Patent: Aug. 30, 2005

(54) ELECTROHYDRAULIC PRESSURE CONTROL DEVICE

(75) Inventor: Reinhold Jocham, Hechingen (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 10/258,214

(22) PCT Filed: Feb. 5, 2002

(86) PCT No.: PCT/DE02/00403
§ 371 (c)(1),
(2), (4) Date: Jun. 2, 2003

(87) PCT Pub. No.: WO02/066305
PCT Pub. Date: Aug. 29, 2002

(65) Prior Publication Data
US 2004/0012257 A1 Jan. 22, 2004

(30) Foreign Application Priority Data
Feb. 21, 2001 (DE) .......................................... 101 08 208

(51) Int. Cl.$^7$ ................................................ B60T 8/36
(52) U.S. Cl. ............................... 303/119.2; 251/129.15
(58) Field of Search ......................... 303/119.2, 119.3, 303/DIG. 10; 138/596.17, 884; 251/129.15

(56) References Cited

U.S. PATENT DOCUMENTS

| | | | | |
|---|---|---|---|---|
| 5,662,392 A | * | 9/1997 | Hinz ........................ | 303/119.2 |
| 5,722,742 A | * | 3/1998 | Reinartz et al. .......... | 303/119.2 |
| 5,762,318 A | * | 6/1998 | Staib et al. ............. | 251/129.15 |
| 5,842,753 A | * | 12/1998 | Staib et al. .............. | 303/119.3 |
| 5,988,770 A | * | 11/1999 | Volz ........................ | 303/119.3 |
| 6,412,754 B1 | * | 7/2002 | Ogino et al. ........... | 251/129.15 |
| 6,688,904 B1 | * | 2/2004 | Schnalzger et al. ......... | 439/404 |

FOREIGN PATENT DOCUMENTS

| | | |
|---|---|---|
| DE | 43 43 325 A | 6/1995 |
| DE | 44 02 735 A | 8/1995 |
| DE | 197 18 835 A | 11/1998 |
| DE | 199 40 696 A | 10/2000 |

* cited by examiner

Primary Examiner—Chris Schwartz
(74) Attorney, Agent, or Firm—Ronald E. Greigg

(57) ABSTRACT

The invention relates to an electrohydraulic brake slip control device for motor vehicles, including one or more electromagnetically actuatable hydraulic valves contained in a valve block, having valve domes, which protrude at least partway beyond the valve block in the direction of a valve axis and each engage in a coil opening of an electric coil held by a coil holder, and having contact elements, which protrude away from the coils and through openings of a top plate, in order to electrically activate the coils. At least some of the coils are held against the coil holder in a plane perpendicular to the valve axes with an easily moving play, but also in a position-oriented fashion and, after their alignment produced by the engagement of the valve domes in the associated coil openings, can be rigidly fixed in the aligned position.

15 Claims, 3 Drawing Sheets

ELECTROHYDRAULIC PRESSURE CONTROL DEVICE

CROSS-REFERENCE TO RELATED APPLICATIONS

This application is a 35 USC 371 application of PCT/DE 02/00403 filed on Feb. 5, 2002.

BACKGROUND OF THE INVENTION

1. Field of the Invention

The invention is based on an electrohydraulic pressure control device, in particular a brake slip control device for motor vehicles, including one or more electromagnetically actuatable hydraulic valves contained in a valve block, having valve domes, which protrude at least partway beyond the valve block in the direction of a valve axis and each engage in a coil opening of an electric coil held by a coil holder, and having contact elements, which protrude away from the coils and through openings in a top plate, for electrically contacting the coils.

2. Description of the Prior Art

In the manufacture of pressure control devices of the above kind, the problem arises that the valve domes have to be inserted into the coil openings of the coils held by the coil holder and the contact elements have to be inserted into the openings in the top plate, which requires tightly toleranced fitting play clearances because even a slight axial offset between the hydraulic valves complicates the process of assembling the coils and the top plate.

In order to counteract this problem, DE 41 00 967 A1 has proposed an electrohydraulic pressure control device of the type mentioned at the beginning in which an elastic retainer connected to the coil holder holds the coils so that the coils can execute aligning movements during the assembly process. The fixing of the coils on the coil holder is also executed exclusively by means of the elastic retainer after insertion of the valve domes into the coil openings. This process, however, has the disadvantage that the elastic retainer is intensely deformed by larger axial deviations and stress peaks occur then, which can reduce the fatigue strength of the retainer. Moreover, brake pressure control devices of motor vehicles are often subjected to an intense oscillation stress so that the flexible support of the coils in the current instance can lead to oscillation problems, for example in the form of resonance excitations. Finally, due to the deformation of the elastic retainer during the assembly, undesirable frictional forces are produced between the coils and the valve domes.

SUMMARY OF THE INVENTION

Since the coils are not elastically connected to the coil body during their aligning movements, they can be aligned freely and easily according to the respective position of the valve axis of the associated valve. To a large degree, this prevents undesirable friction and binding between the components. The position-oriented receptacle on the coil holder assures that the contact elements of the coils are aligned in the correct angular position in relation to the openings of the top plate to be subsequently placed onto the coil housing. Since the coils are rigidly fixed without elasticity after being aligned in the coil housing, oscillation problems that could arise from an excessively flexible support are prevented from the outset.

Advantageous modifications and improvements of the invention are also possible.

A particularly preferable modification of the invention provides that the coil holder be constituted by a coil housing, which can be placed onto the valve block and which contains through openings as support bushes, which are coaxial to the valve axes and whose inner diameters are greater than the outer diameters of the associated coils in order to produce a moving play for the coils and that the support bushes each have an axial stop for the coils.

Another preferable step provides that the coils, after being inserted into the support bushes and after being aligned in them, can be clamped between the axial stop and at least one hold-down clamping device affixed to the coil housing.

According to one modification, the axial stop simultaneously constitutes a rotation prevention means for the coils and has at least one pin-shaped projection, which protrudes radially inward from the support bush wall and is embodied so that it can engage in a radially external recess of the coil, which has a greater radial span than the projection. Such a projection/recess pairing, therefore, has a double function because on the one hand, it functions as an axial stop and on the other hand, it functions as a rotation prevention means, which advantageously reduces the number of parts of the brake slip control device.

A further step provides that the hold-down clamping device be constituted by the top plate that can be fastened to the coil housing, with cylinder sections, which protrude away from it toward the coils, coaxial to the valve axes, and which are embodied so that they can be brought into axial contact with the end faces of the coils.

BRIEF DESCRIPTION OF THE DRAWINGS

An exemplary embodiment of the invention is described herein below, with reference to the drawings, in which.

DESCRIPTION OF THE PREFERRED EMBODIMENT

Figure 1:
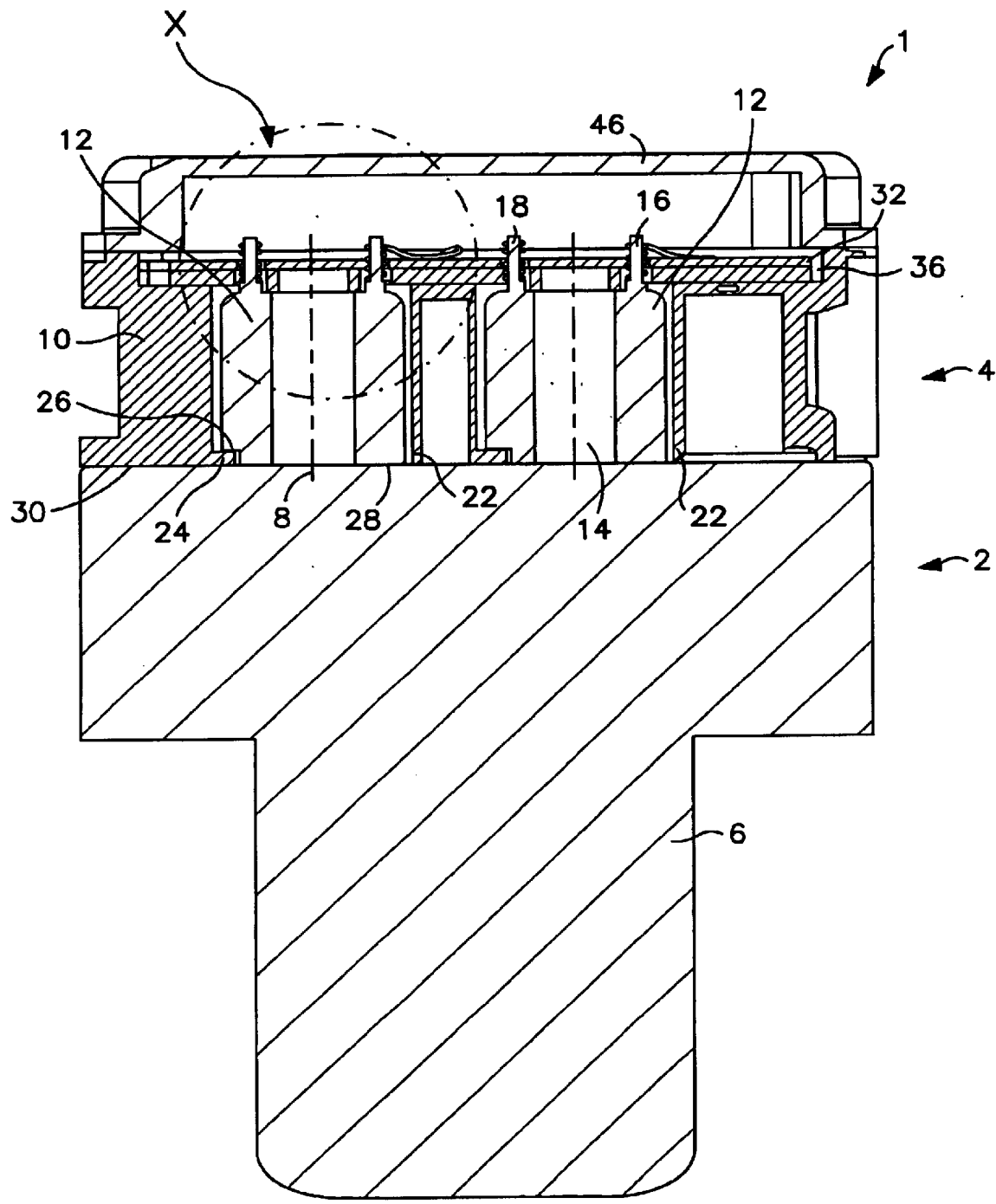
FIG. 1 shows a cross section through an electric part of a brake slip control device for motor vehicles.

In FIG. 1, a brake slip control device of a motor vehicle is labeled with the reference numeral 1 and is comprised of a hydraulic part 2 and an electric part 4. The hydraulic part 2 includes a number of electromagnetically actuatable hydraulic valves contained in a valve block 6, having valve domes, which protrude at least partway beyond the valve block 6 in the direction of a valve axis 8; the hydraulic valves are not shown in FIG. 1 for scale reasons.

The valve domes are each encompassed by an electric coil 12, which is secured by a coil holder 10 and has a cylindrical opening 14 in the center. The tops of the coils 12 have two upward protruding pins 16, 18 attached to them, which are parallel to the valve axis 8 and onto which the ends 20 of coil wires are wound in a helical faction, as shown particularly by the pin 18 of the left side in FIG. 2.

The coil holder is constituted by a coil housing 10, which is preferably embodied as an injection molded body and can be placed onto the valve block 6, and which has through openings as support bushes 22, which are coaxial to the valve axes 8 and which contain the coils 12. The inner diameter of the support bushes 22 is greater than the outer diameter of the associated coils 12 in order to produce a moving play for the coils 12 in a plane perpendicular to the valve axes 8.

Figure 4:
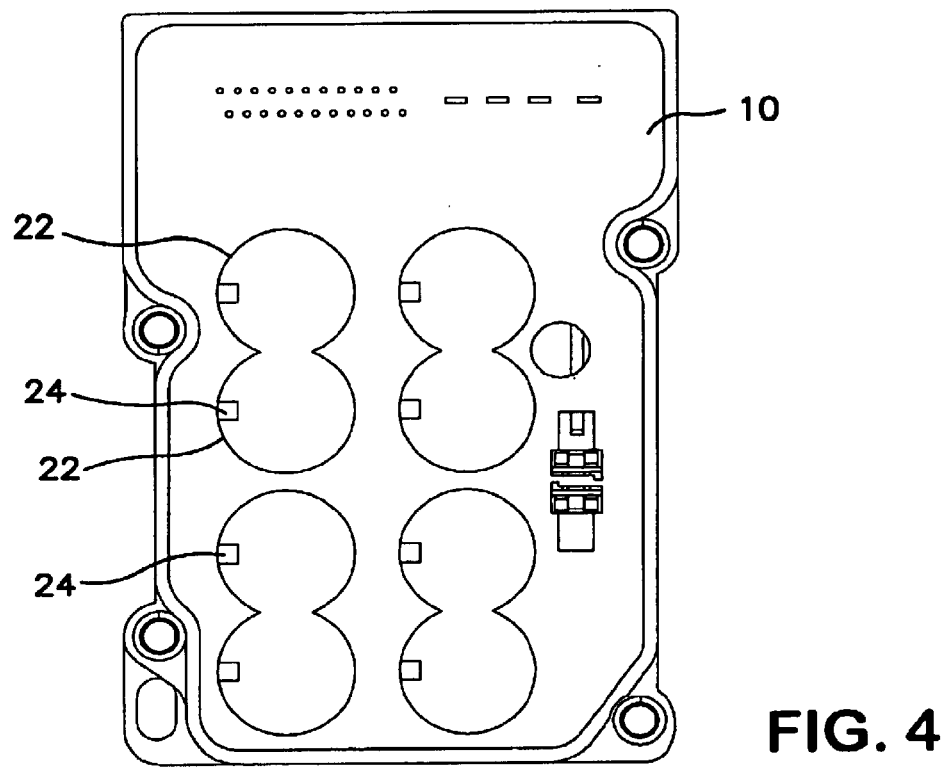
FIG. 4 shows a top view of a coil housing of the electric part of FIG. 1, without coils.
Figure 3:
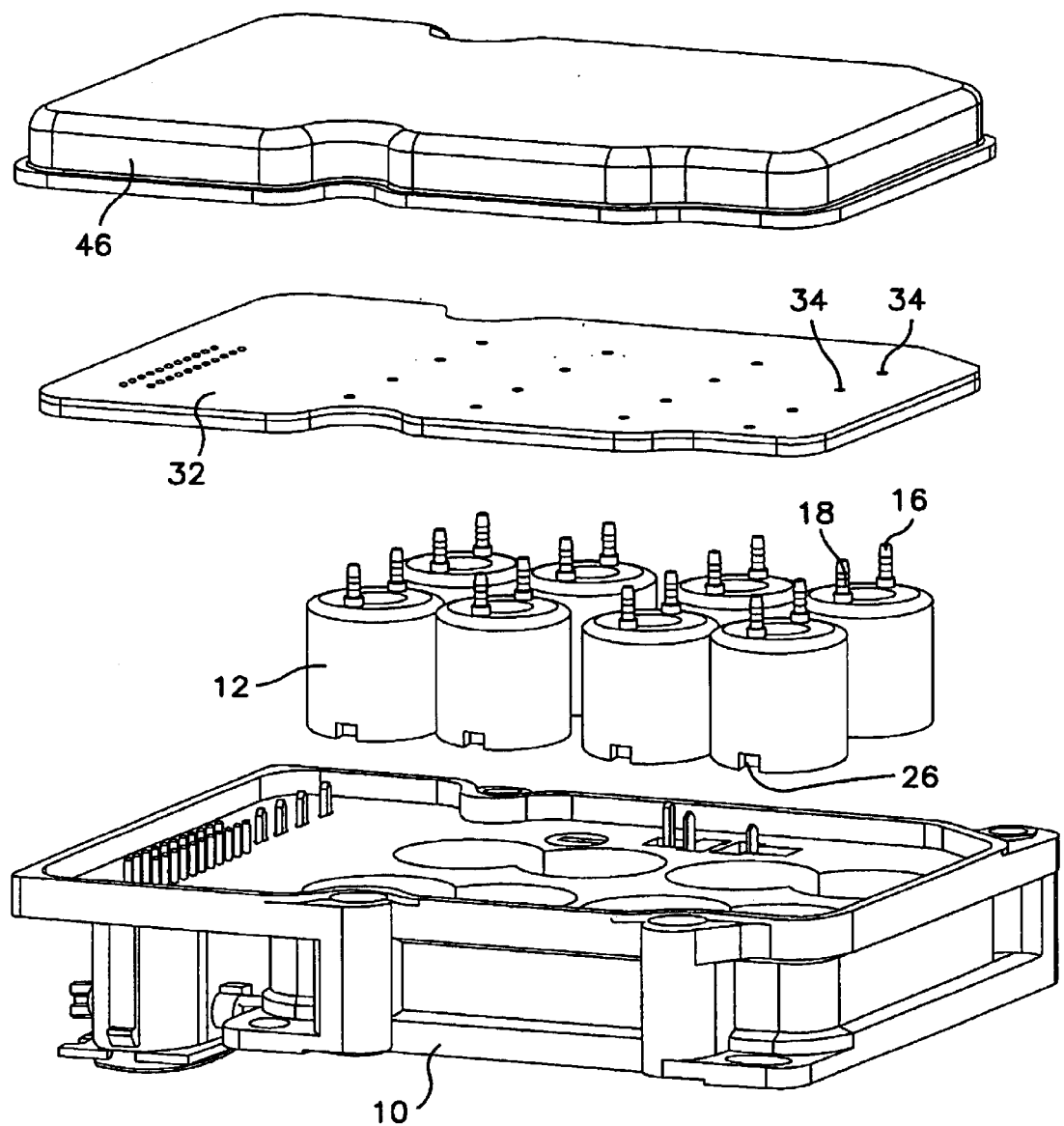
FIG. 3 shows a schematic representation of the assembly of the electric part of the brake slip control device from FIG. 1.

In order to assemble the electric part 4 of the brake slip control device 1, first the coils 12 are inserted from above into the coil housing 10 in a position-oriented fashion, as is depicted particularly in FIG. 3. The axial position of the coils is determined by an axial stop, which is constituted, for example, by means of at least one pin-shaped projection 24, which protrudes radially inward from the support bush 22 and is embodied so that it can engage in a radially external recess 26 of the coil 12, which is open toward the outside, as depicted in FIGS. 1 and 4. The recess 26 has a cross section that is complementary to that of the projection 24, but has a greater radial span than the projection, permitting a moving play of the coil 12 in relation to the coil housing 10, which play is limited, but permits easy movement within the limits. The projections 24 are preferably disposed on the edge of each support bush 22 oriented toward the valve block 6 and the recesses 26 are preferably disposed on the edge of the associated coil 12 oriented toward the valve block 6 so that the end faces 28 of the coils 12 oriented toward the valve block 6 are flush with the bottom surface 30 of the coil housing 10 oriented toward the valve block 6.

According to another assembly step, the coil housing 10 preassembled with the coils 12 is placed onto the valve block 6; the valve domes engage in the cylindrical openings 14 of the coils 12 from underneath and align them, due to their moving play clearance, in the plane perpendicular to the valve axes 8. In this manner, position deviations of the valve axes 8 relative to one another can be compensated.

The projection/recess pairing 24, 26 associated with each coil 12 functions not only as an axial stop, but also as a rotation prevention means for the respective coil 12, in order to be able to insert it in a position-oriented fashion into the coil housing 10, as can be easily imagined in conjunction with FIG. 3. The angular position of the coils 12 in relation to the coil housing 10 plays a role when, in a further assembly step, a top plate 32, which is provided with two through openings 34 for the pins 16, 18 attached to the top of each coil 12, is placed as a cover into a recessed step 36 at the top of the coil housing 10 and the through openings 34 must be aligned with the associated pins 16, 18, as shown in FIG. 3. The top pins 16, 18 can be dispensed with as supports for the coil wire ends 20 if the ends 20 of the coil wires themselves are sufficiently rigid to be able to protrude in the vertical position through the through openings 34 of the top plate 32, which is for example possible by means of coil wires that are double wound at the ends 20.

Figure 2:
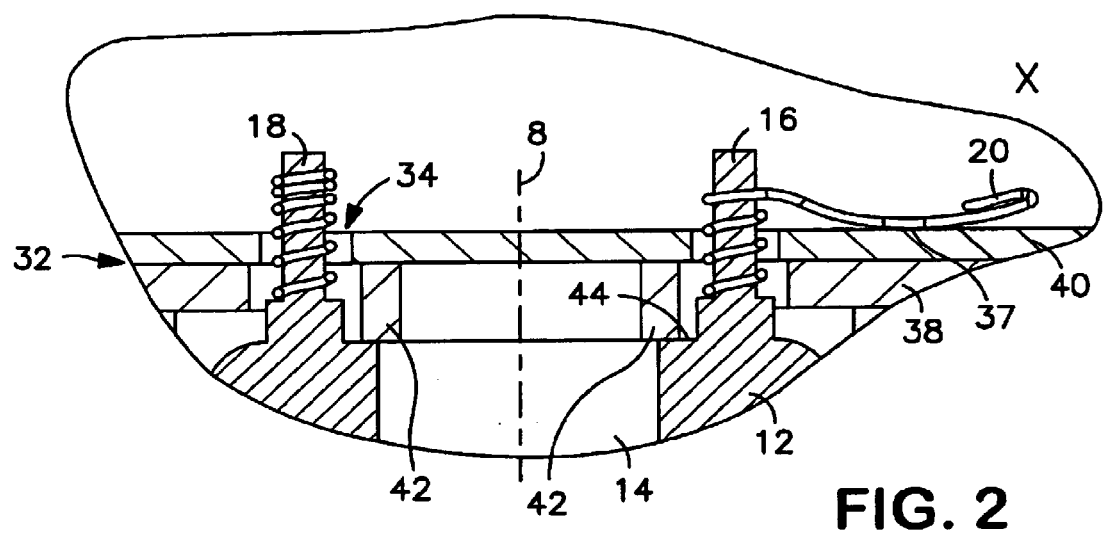
FIG. 2 shows the detail X from FIG. 1.

The top plate 32 is comprised of a printed circuit substrate 38 oriented toward the valve block, which has a printed circuit board 40 on its side oriented away from the valve block 6, with strip conductors that are electrically contacted by the coil wire ends 20 of the coils 12 in order to permit the coils to be activated by a set of control electronics (FIG. 2). The printed circuit board 40 is preferably laminated onto the printed circuit substrate 38. The pins 16,18 of the coils protrude through the through openings 34 of the top plate 32, wherein the cross section of the through openings 34 is dimensioned as relatively large in order to permit an unhindered alignment of the coils 12 inside the coil housing 10. After the top plate 32 is placed onto the coil housing 10, the ends 20 of the coil wires are unwound from the pins 16, 18 in such a way that they can be brought into electrical contact at the provided locations with the strip conductors of the printed circuit board 40 and at the same time, there is still enough loose coil wire length to assure the full movement play clearance of the coils 12 inside the support bushes 22, without the coil wires being placed under tensile stress. This situation is shown by the pin 16 on the right in FIG. 2, where the end 20 of the coil wire is soldered or bonded to the associated surface 37 of the strip conductor.

The top plate 32 is also used a hold-down and clamping element for the coils 12 in that the printed circuit board 40 has hold-down clamping elements, which protrude toward the coils 12 and are embodied, for example, as cylinder sections 42, which are coaxial to the valve axes 8 and are each embodied so that they can be brought into axial contact with a radially inner section of the end faces 44 of the coils 12 pointing away from the valve block 6 when the top plate 32 is fastened in the desired position on the coil housing 10, for example by means of screw connections. As a result, after being aligned, the coils 12 are clamped in a positively and frictionally engaging fashion between the top plate 32 and the axial stops of the coil housing 10 embodied as projections 24; the positive engagement is produced by the play-encumbered engagement of the projections 24 in the associated recesses 26 and the position of the coils 12 aligned with the valve axes 8 is then maintained in a rigid, frictionally engaging fashion by the axial pressure of the top plate 32. Finally, a cover 46 that is placed onto the coil housing 10 closes the electric part 4 of the brake slip control device 1 (FIG. 3).

The foregoing relates to preferred exemplary embodiments of the invention, it being understood that other variants and embodiments thereof are possible within the spirit and scope of the invention, the latter being defined by the appended claims.

What is claimed is:

1. In an electrohydraulic brake slip control device (1) for motor vehicles, including one or more electromagnetically actuatable hydraulic valves contained in a valve block (6), having valve domes, which protrude at least partway beyond the valve block (6) in the direction of a valve axis (8) and each engage in a coil opening (14) of an electric coil (12) held by a coil holder (10), and having contact elements (20), which protrude away from the coils (12) and through openings (34) of a top plate (32), in order to electrically activate the coils (12), the improvement wherein at least some of the coils (12) are held against the coil holder (10) in a plane perpendicular to the valve axes (8) with an easily moving play, but also in a position-oriented fashion, and wherein after their alignment produced by the engagement of the valve domes in the associated coil openings (14), the coils (12) can be rigidly fixed in the aligned position, wherein the coil holder is constituted by means of a coil housing (10), adapted to be placed onto the valve block (6), the coil housing (10) containing through openings as support bushes (22) coaxial to the valve axes (8), the inner diameter of the through openings being greater than the outer diameter of the associated coils (12) in order to produce a moving play for the coils (12), wherein the support bushes (22) each have an axial stop (24) for the coils (12), and wherein, after being inserted into the support bushes (22) and being aligned in them, the coils (12) are clamped between the axial stop (24) and at least one hold-down clamping element (42) affixed to the coil housing (10).

2. The pressure control device according to claim 1, wherein the axial stop simultaneously constitutes a rotation prevention means for the coils (12) and has at least one pin-shaped projection (24), which protrudes radially inward from the support bush (22) and is embodied so that it can engage in a radially external recess (26) of the coil (12), which recess has a greater radial span than the projection (24).

3. The pressure control device according to claim 2, wherein the projection (24) is respectively disposed on the edge of each support bush (22) oriented toward the valve block (6) and the recess (26) is preferably disposed on the edge of the associated coil (12) oriented toward the valve block (6).

4. The pressure control device according to claim 3, wherein the end face (28) of at least one of the coils (12) oriented toward the valve block (6) is flush with the bottom surface (30) of the coil housing (10) oriented toward the valve block (6).

5. The pressure control device according to claim 4, wherein the coil housing (10) is comprised of an injection molded part.

6. The pressure control device according to claim 2, wherein the coil housing (10) is comprised of an injection molded part.

7. The pressure control device according to claim 2, wherein the hold-down clamping device is constituted by the top plate (32) that can be fastened to the coil housing (10), the top plate including cylinder sections (42) which protrude away from it toward the coils (12), coaxial to the valve axes (8), and which are embodied so that they are brought into axial contact with the end faces (44) of the coils (12) pointing away from the valve block (6).

8. The pressure control device according to claim 3, wherein the coil housing (10) is comprised of an injection molded part.

9. The pressure control device according to claim 3, wherein the hold-down clamping device is constituted by the top plate (32) that can be fastened to the coil housing (10), the top plate including cylinder sections (42) which protrude away from it toward the coils (12), coaxial to the valve axes (8), and which are embodied so that they are brought into axial contact with the end faces (44) of the coils (12) pointing away from the valve block (6).

10. The pressure control device according to claim 4, wherein the hold-down clamping device is constituted by the top plate (32) that can be fastened to the coil housing (10), the top plate including cylinder sections (42) which protrude away from it toward the coils (12), coaxial to the valve axes (8), and which are embodied so that they are brought into axial contact with the end faces (44) of the coils (12) pointing away from the valve block (6).

11. The pressure control device according to claim 1, wherein the hold-down clamping device is constituted by the top plate (32) that can be fastened to the coil housing (10), the top plate including cylinder sections (42) which protrude away from it toward the coils (12), coaxial to the valve axes (8), and which are embodied so that they are brought into axial contact with the end faces (44) of the coils (12) pointing away from the valve block (6).

12. The pressure control device according to claim 11, wherein the top plate (32) is comprised of a printed circuit board (40) laminated onto a printed circuit substrate (38), with strip conductors that are contacted by coil wire ends (20) of the coils (12).

13. The pressure control device according to claim 12, further comprising a top plate (32) with two through openings (34) for pins (16, 18) of each coil (12) which pins are attached to the top of the coils (12) and protrude beyond the plate (32), and around which the ends (20) of the coil wires are wound in helical fashion.

14. The pressure control device according to claim 13, wherein the ends (20) of the coil wires can be unwound from the pins (16, 18) in such a way that they can be brought into electrical contact with the strip conductors at the provided locations and at the same time, there is still enough loose coil wire length to assure the full movement play clearance of the coils (12) inside the support bushes (22), without the coil wires being placed under tensile stress.

15. The pressure control device according to claim 1, wherein the coil housing (10) is comprised of an injection molded part.

* * * * *

UNITED STATES PATENT AND TRADEMARK OFFICE
CERTIFICATE OF CORRECTION

PATENT NO. : 6,935,706 B2 Page 1 of 1
DATED : June 2, 2003
INVENTOR(S) : Reinhold Jocham et al.

It is certified that error appears in the above-identified patent and that said Letters Patent is hereby corrected as shown below:

<u>Title page,</u>
Please add the second inventor as follows:
-- [75]   Inventor:   Reinhold Jocham, Hechingen (DE);
                            Peter Jares, Sindelfingen (DE) --.

Signed and Sealed this

Fourth Day of October, 2005

JON W. DUDAS
*Director of the United States Patent and Trademark Office*